United States Patent
Fang et al.

(10) Patent No.: US 8,264,833 B2
(45) Date of Patent: Sep. 11, 2012

(54) ANTI-VIBRATION HARD DISK DRIVE ASSEMBLY

(75) Inventors: Tsai-Yin Fang, Taipei Hsien (TW); Chao-Tang Wang, Taipei Hsien (TW); Chih-Wei Ke, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 308 days.

(21) Appl. No.: 12/764,101

(22) Filed: Apr. 21, 2010

(65) Prior Publication Data

US 2011/0128695 A1 Jun. 2, 2011

(30) Foreign Application Priority Data

Dec. 1, 2009 (TW) ................................ 98140932 A

(51) Int. Cl.
*G06F 1/16* (2006.01)

(52) U.S. Cl. ........... 361/679.34; 361/679.36; 312/223.1; 312/223.2

(58) Field of Classification Search ............. 361/679.35, 361/679.39; 439/928.1
See application file for complete search history.

(56) References Cited

U.S. PATENT DOCUMENTS

| | | | | |
|---|---|---|---|---|
| 4,705,257 A * | 11/1987 | Leo et al. | ...................... | 248/611 |
| 4,713,714 A * | 12/1987 | Gatti et al. | .................... | 360/137 |
| 6,094,342 A * | 7/2000 | Dague et al. | ............. | 361/679.33 |
| 6,469,889 B1 * | 10/2002 | Gan | ......................... | 361/679.33 |
| 6,600,648 B2 * | 7/2003 | Curlee et al. | ............. | 361/679.34 |
| 7,016,189 B2 * | 3/2006 | Lin | ......................... | 361/679.34 |
| 7,019,966 B2 * | 3/2006 | Lee | ......................... | 361/679.36 |
| 7,221,565 B2 * | 5/2007 | Ko | ......................... | 361/679.34 |
| 7,616,436 B2 * | 11/2009 | DeMoss et al. | ........... | 361/679.34 |
| 7,983,033 B2 * | 7/2011 | Antonuccio et al. | ...... | 361/679.34 |
| 7,995,337 B2 * | 8/2011 | Kuo | ......................... | 361/679.34 |
| 2002/0006030 A1 * | 1/2002 | Evanson et al. | ............... | 361/724 |

* cited by examiner

Primary Examiner — Anthony Q Edwards
(74) Attorney, Agent, or Firm — Altis Law Group, Inc.

(57) ABSTRACT

An exemplary of an anti-vibration hard disk drive assembly includes a hard disk drive, a bracket containing the hard disk drive, a rack supporting the hard disk drive and the bracket, and an elastic structure disposed between the bracket and the rack. The rack includes a pair of rails supporting the bracket thereon. The elastic structure is disposed between the bracket and the pair of rails of the rack, whereby a vibration caused operation of the hard disk drive can be absorbed by the elastic structure.

15 Claims, 3 Drawing Sheets

ANTI-VIBRATION HARD DISK DRIVE ASSEMBLY

BACKGROUND

1. Technical Field

The present disclosure relates to a hard disk drive, particularly, to an anti-vibration hard disk drive assembly.

2. Description of Related Art

With development in computer technology, computers have become an indispensable part of our daily life. In a computer, a hard disk drive (HDD) is needed for storing information. The HDD is usually mounted in a bracket and the bracket is then mounted in a rack of the computer. The HDD is directly inserted into the bracket, and a number of fasteners extend through sidewalls of the bracket to engage the HDD. However, during operation, vibrations generated by the HDD may cause the HDD and or the bracket to strike against the rack and cause an annoying sound.

What is needed, therefore, is an anti-vibration hard disk drive assembly.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
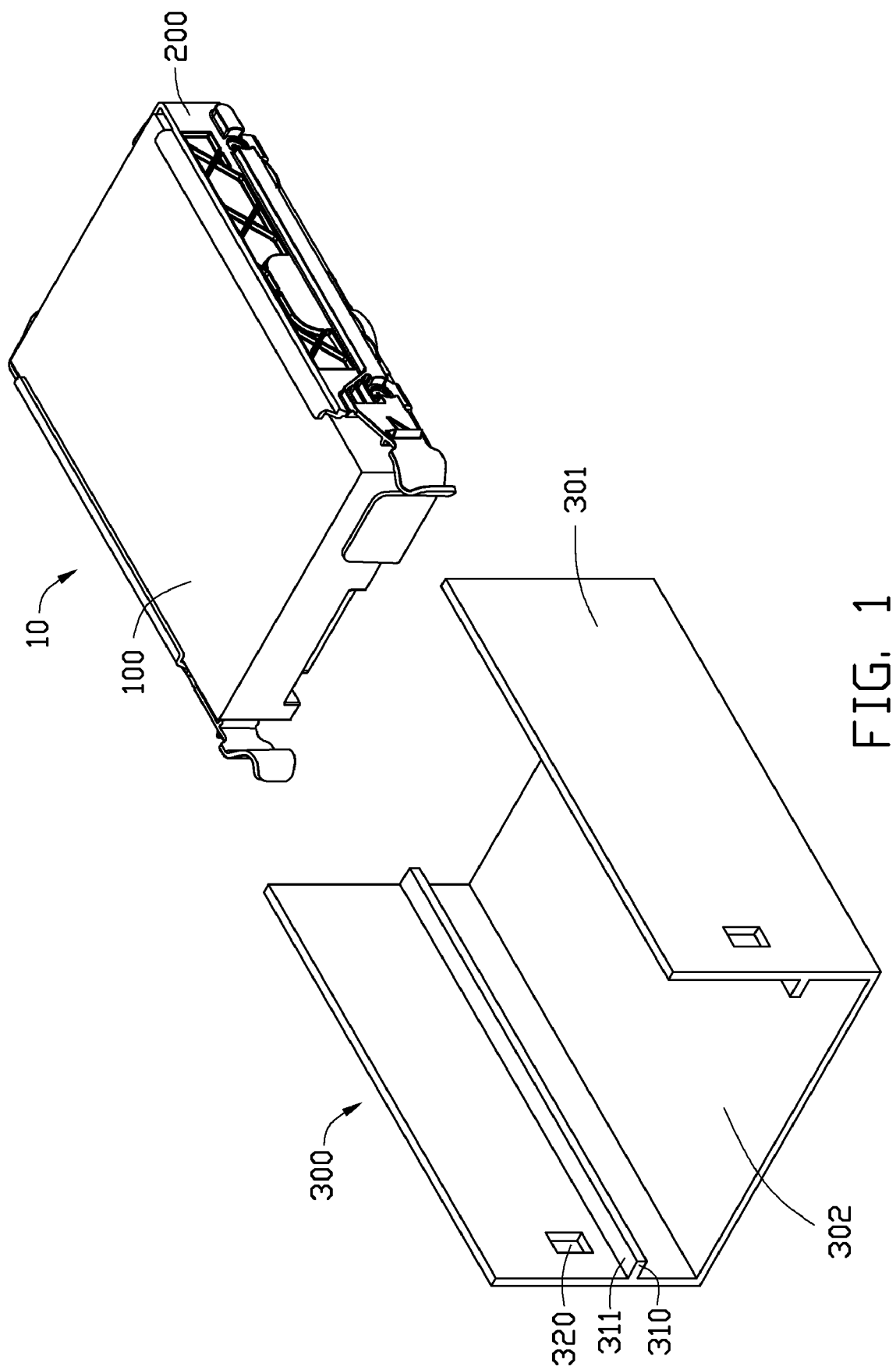
FIG. 1 is a partial, exploded view of an anti-vibration hard disk drive assembly in accordance with an exemplary embodiment of the disclosure.
Figure 2:
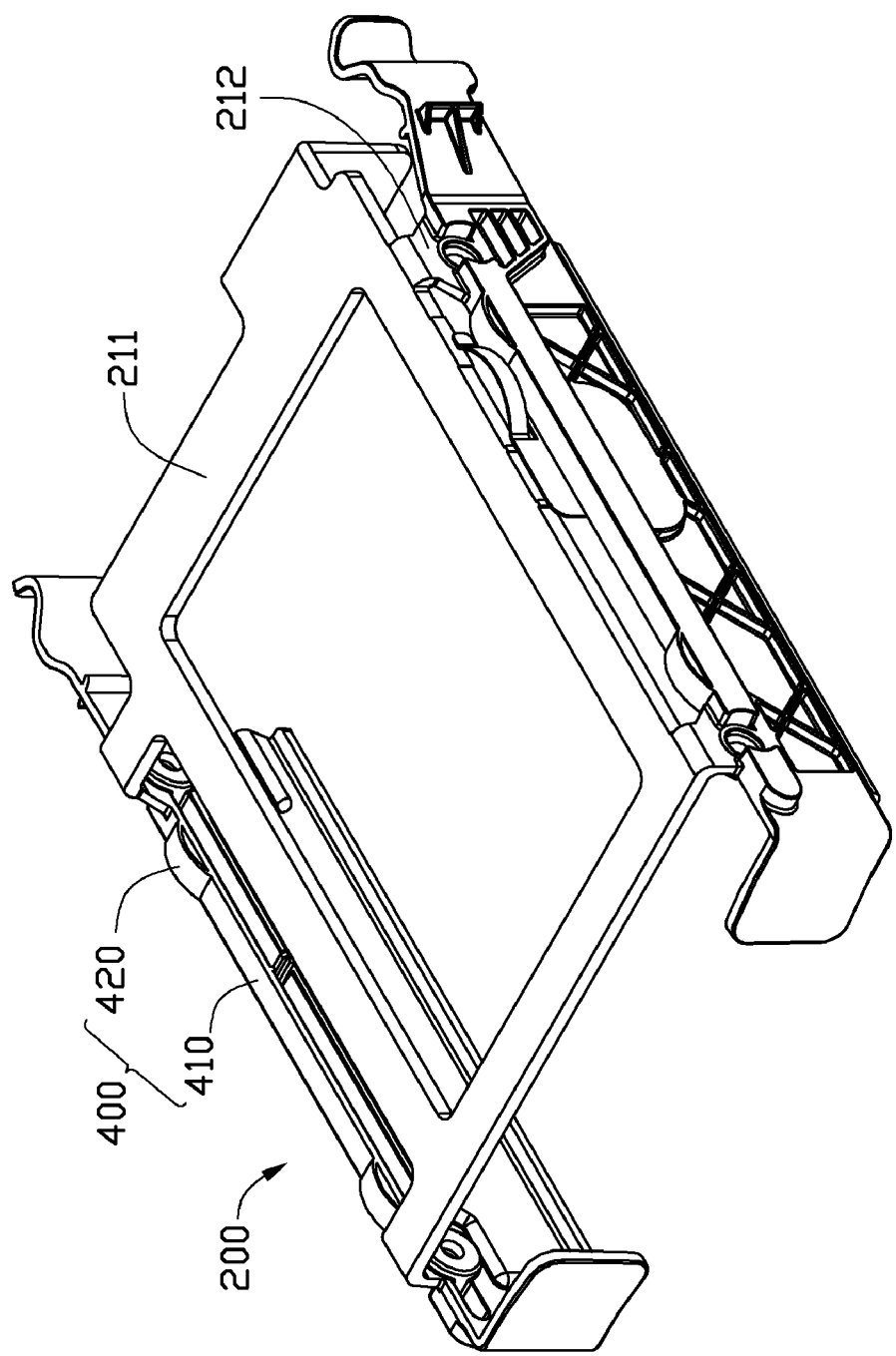
FIG. 2 is an enlarged, inverted view of a bracket of the anti-vibration hard disk drive assembly shown in FIG. 1.
Figure 3:
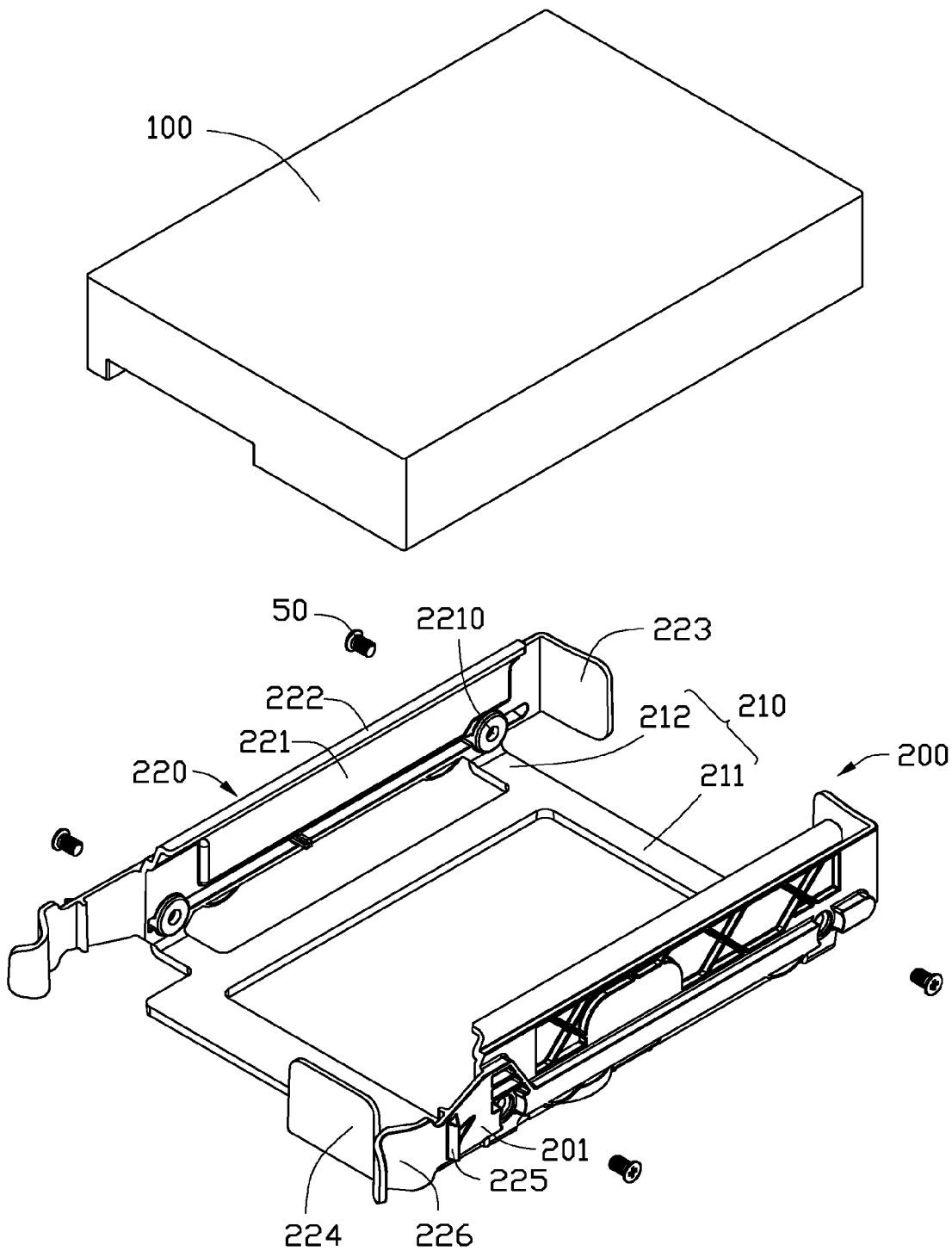
FIG. 3 is an exploded view of an assembly of the bracket and a hard disk drive shown in FIG. 1.

Referring to FIGS. 1-3, an exemplary embodiment of an anti-vibration hard disk drive (HDD) assembly 10 includes an HDD 100, a bracket 200 containing the HDD 100, and a rack 300 supporting an assembly of the HDD 100 and the bracket 200. The bracket 200 may be made of a hard but resiliently flexible material such as certain plastics, metals, and integral to the structure of the bracket 200 are a chassis 210 and two opposite sidewalls 220 connected to two opposite edges of the chassis 210. The chassis 210 and the two sidewalls 220 cooperatively define a space for receiving the HDD 100. The bracket 200 is disposed with dampers in contact with the rack 300 to efficiently absorb any vibration caused by spinning parts of the HDD 100, thereby preventing annoying sounds. The HDD assembly 10 can be used in computers, servers or other electronic devices.

The chassis 210 of the bracket 200 includes a rectangular base 211 and a number of bent connecting parts 212 extending outwardly from the base 211 and connecting with the two sidewalls 220. Two connecting parts 212 extend horizontally and outwardly from two ends of each of the two sides of the base 211 and extend upward to incline to the base 211. That is, each of the connecting parts 212 includes a flat part connected to the base 211 and an oblique part extending upwardly from the flat part.

Each of the two sidewalls 220 includes an elongated plate 221, a resisting plate 222, a first baffling plate 223, a second baffling plate 224, a clipping part 225 and an operating part 226. The plate 221 is a rectangular flat plate, two connecting parts 212 of the chassis 210 are connected to two ends of a bottom edge of the plate 221. As a result, the chassis 210 is located lower than the two sidewalls 220. The resisting plate 222 horizontally and inwardly extends from a top edge of the plate 221. The resisting plate 222 is also an elongated plate as long as or shorter than the plate 221. Two resisting plates 222 of the two sidewalls 220 are spaced apart from each other by a predetermined distance to define an entrance for the HDD 100 being inserted into the bracket 200. When the HDD 100 is received in the bracket 200, the two resisting plates 222 resist against a top surface of the HDD 100.

The first baffling plate 223 extends inwardly from a rear end of the plate 221 of each of the two side walls 220, and therefore two first baffling plates 223 are formed at two rear ends of the two sidewalls 220. Two first baffling plates 223 are spaced apart from each other by a predetermined distance and are perpendicular to the plate 221. When the HDD 100 is received in the bracket 200, the two first baffling plates 223 resist against a rear surface of the HDD 100. The second baffling plate 224 extends upwardly from a front end of the base 211 of the chassis 210. The second baffling plate 224 and the two first baffling plates 223 cooperatively prevent the HDD 100 from moving forward and backward on the bracket 200. In the present embodiment, heights of the two first baffling plates 223 and the second baffling plate 224 are equal to or slightly less than heights of the two sidewalls 220. The second baffling plate 224 is half as long as a width of the base 211, and the second baffling plate 224 is connected to a side of the front end of the base 211 along a widthwise direction of the base 211.

The clipping part 225 is configured for securing the assembly of the HDD 100 and the bracket 200 to the rack 300. A plate-like extending section 201 extends forward from a front end of the plate 221, the clasping structure 225, such as a protruded block, protrudes from an outer side of the plate-like extending section 201. The operating part 226 extends forward from the plate-like extending section 201 and has a curved generally S-shaped configuration with certain elasticity for resilient operation.

Two threaded holes 2210 are defined in two ends of a lower portion of each plate 221. When the HDD 100 is inserted in the bracket 200, four screws 50 extend through four threaded holes 2210 of the plates 221 of the two sidewalls 220 and resist sides of the HDD 100, thereby fixing the HDD 100 in the bracket 200.

The rack 300 includes a pair of parallel side plates 301 and a bottom plate 302. The side plates 301 are connected perpendicularly to two opposite edges of the bottom plate 302, respectively. A pair of rails 310 protrudes inwardly from inner side surfaces of the pair of side plates 301, respectively. Each of the rails 310 extends from one end of a corresponding side plate 301 to another end. The pair of rails 310 supports the bottom surface of the plates 221 of the two sidewalls 220. A pair of clasping recesses 320 is defined in front end portions of the inner side surfaces of the pair of side plates 301, respectively. The pair of clasp recesses 320 is located over the pair of rails 310, and is configured to receive the two clipping parts 225 of the two sidewalls 220, respectively, thereby fixing the bracket 200 to the rack 300. It is understood that two or more pairs of rails 310 and clasping recesses 320 can be formed in the rack 300, whereby two or more assemblies of the HDD 100 and the bracket 200 can be set in the rack 300.

An elastic structure 400 is disposed between the bottom surface of each plate 221 and a top surface 311 of the corresponding rail 310. In the present embodiment, the elastic structure 400 is disposed on the bottom surface of each plate 221. The elastic structure 400 has an integral structure and includes an elongated strip 410 and a number of vibration dampers 420. The dampers 420 can be compressed or distorted along a direction perpendicular to the strip 410. The strip 410 is pasted to the bottom surface of each plate 221 by an adhesive. The dampers 420 are equidistantly formed on the strip 410. In the present embodiment, each damper 420 is an arc-shaped sheet as wide as the strip 410. Each damper 420 has two ends and a middle portion between the two ends. The two ends are integrally protruded from the strip 410, and the middle portion is spaced from a corresponding portion of the strip 410 over the middle portion of the damper 420. It is noted that shapes of the dampers 420 can be varied, so long as the dampers 420 can be resiliently compressed or distorted to thereby absorb vibrations between the bracket 200 and the rails 310 of the rack 300. Thus, the vibration caused by spinning parts of the HDD 100 can be absorbed and eliminated by the damper 420 of the elastic structure 400. By damping of the vibrations caused by the HDD 100, noise causing contact between parts of the HDD 100 and the bracket 200 with the rack 300 or other parts of the computer is prevented.

In assembling the assembly of the HDD 100 and the bracket 200 to the rack 300, the two operating parts 226 are pressed inwardly to enable the two clasping structures 225 to move inwardly, and the bracket 200 is slid inwardly along the pair of rails 310 of the rack 300 to reach a predetermined position, then the two operating parts 226 are released to enable the two clasping structures 225 to move outwardly and engage respectively in the two clasping recesses 320 of the rack 300. In disassembling the assembly of the HDD 100 and the bracket 200 from the rack 300, the two operating parts 226 are pressed inwardly to disengage the two clasping structures 225 from the two clasping recesses 320 of the rack 300. Then the assembly of the HDD 100 and the bracket 200 can be drawn out of the rack 300 by being slid outwardly along the pair of rails 310 of the rack 300.

Due to the existence of the elastic structure 400, the bottom surface of the plates 221 of the bracket 200 elastically resists the rails 310. When the HDD 100 works, any vibration caused by spinning parts of the HDD 100 is dampened. Thereby annoying sounds caused by the vibration can be weakened or eliminated.

It is to be understood, however, that even though numerous characteristics and advantages of the present embodiments have been set forth in the foregoing description, together with details of the configurations and functions of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

The invention claimed is:

1. An anti-vibration hard disk drive assembly comprising:
a hard disk drive;
a bracket containing the hard disk drive;
a rack comprising a pair of rails supporting the bracket thereon; and
a pair of elastic structures;
wherein each elastic structure is disposed between the bracket and a corresponding one of the rails of the rack, whereby a vibration caused during operation of the hard disk drive can be absorbed by the elastic structure; and
wherein the elastic structure comprises a strip and a plurality of dampers, the dampers can be compressed or distorted along a direction perpendicular to the strip, and the strip is pasted to a bottom portion of the bracket.

2. The anti-vibration hard disk drive assembly of claim 1, wherein the bracket comprises a chassis and two opposite sidewalls connected to two opposite edges of the chassis, and the hard disk drive is received in a space defined by the chassis and the two sidewalls.

3. The anti-vibration hard disk drive assembly of claim 2, wherein bottoms of the two sidewalls are supported by the pair of rails, respectively, and each elastic structure is disposed between the bottom of one of the two sidewalls and the corresponding rail.

4. The anti-vibration hard disk drive assembly of claim 3, wherein the dampers of each elastic structure are compressed between the bottom of the one of the two sidewalls and the corresponding rail.

5. The anti-vibration hard disk drive assembly of claim 4, wherein the dampers of each elastic structure are equidistantly formed on the strip.

6. The anti-vibration hard disk drive assembly of claim 4, wherein each of the dampers of each elastic structure is an arc-shaped sheet integrally protruded down from the strip and having two ends connected with the strip and a middle portion between the two ends.

7. An anti-vibration hard disk drive assembly comprising:
a hard disk drive;
a bracket comprising a chassis and two sidewalls connected to two opposite edges of the chassis, the hard disk drive being received in a space defined by the two sidewalls and the chassis; and
a rack comprising a pair of rails, the two sidewalls of the bracket being capable of sliding along the pair of rails, respectively;
wherein an elastic structure is disposed between a bottom of each of the sidewalls of the bracket and a corresponding rail of the rack, whereby a vibration caused during operation of the hard disk drive can be absorbed by the elastic structure; and
wherein the elastic structure comprises a strip and a plurality of dampers, the dampers can be compressed or distorted along a direction perpendicular to the strip, and the strip is pasted to the bottom of the corresponding sidewall of the bracket.

8. The anti-vibration hard disk drive assembly of claim 7, wherein the dampers are compressed between the bottom of the corresponding sidewall of the bracket and the corresponding rail of the rack.

9. The anti-vibration hard disk drive assembly of claim 8, wherein the dampers of the elastic structure are equidistantly formed on the strip.

10. The anti-vibration hard disk drive assembly of claim 8, wherein each of the dampers is an arc-shaped sheet integrally protruded down from the strip and having two ends connected with the strip and a middle portion between the two ends.

11. An anti-vibration hard disk drive assembly comprising:
a hard disk drive;
a bracket containing the hard disk drive;
a rack supporting the bracket; and
a pair of elastic structures disposed between the bracket and the rack to thereby absorb any vibration caused during operation of the hard disk drive;
wherein each of the elastic structures comprises a strip pasted to a bottom portion of the bracket and a plurality of dampers, and each of the dampers can be compressed or distorted along a direction perpendicular to the strip.

12. The anti-vibration hard disk drive assembly of claim 11, wherein the bracket comprises a chassis and two sidewalls connected to two opposite edges of the chassis, and the hard disk drive is received in a space defined by the two sidewalls and the chassis.

13. The anti-vibration hard disk drive assembly of claim 12, wherein the rack comprises a pair of rails, and the two sidewalls of the bracket are capable of sliding along the pair of rails, respectively.

14. The anti-vibration hard disk drive assembly of claim 13, wherein the dampers of each elastic structure are compressed between a corresponding one of the sidewalls of the bracket and a corresponding one of the rails of the rack.

15. The anti-vibration hard disk drive assembly of claim 14, wherein the dampers of each elastic structure are equidistantly formed on the strip.

* * * * *